United States Patent [19]

Todd

[11] 4,198,359

[45] Apr. 15, 1980

[54] APPARATUS FOR GASIFICATION OF LIQUIDS

[76] Inventor: John J. Todd, 11 Overbrook, West Horsley, Surrey, England

[21] Appl. No.: 25,460

[22] Filed: Mar. 30, 1979

Related U.S. Application Data

[63] Continuation-in-part of Ser. No. 873,909, Jan. 31, 1978, abandoned, which is a continuation-in-part of Ser. No. 708,565, Jul. 26, 1976, abandoned.

[51] Int. Cl.² .............................................. B01F 3/04
[52] U.S. Cl. ...................................... 261/77; 210/220; 261/123; 261/124
[58] Field of Search .................. 261/77, 120, 122–124, 261/142, DIG. 75; 210/220, 221 P, 242 A

[56] References Cited

U.S. PATENT DOCUMENTS

| | | | |
|---|---|---|---|
| 1,791,949 | 2/1931 | Boulade | 261/142 X |
| 2,263,892 | 11/1941 | Schaer | 261/124 X |
| 2,630,749 | 3/1953 | Ball et al. | 261/77 X |
| 2,770,319 | 11/1956 | Hagenbook | 261/77 |
| 3,043,433 | 7/1962 | Singer | 261/123 X |
| 3,228,526 | 1/1966 | Ciabattari et al. | 261/124 X |
| 3,246,761 | 4/1966 | Bryan et al. | 261/77 X |
| 3,255,887 | 6/1966 | Walker et al. | 261/124 X |
| 3,318,098 | 5/1967 | Hoddinott et al. | 261/124 X |
| 3,365,860 | 1/1968 | Boris | 261/77 X |
| 3,794,303 | 2/1974 | Hirshon | 261/120 X |
| 3,829,070 | 8/1974 | Reba et al. | 261/77 |
| 3,852,384 | 12/1974 | Bearden | 261/77 |
| 3,855,367 | 12/1974 | Webb | 261/77 |
| 3,969,446 | 7/1976 | Franklin, Jr. | 261/77 X |
| 3,988,396 | 10/1976 | Stannard | 261/124 |
| 4,051,204 | 9/1977 | Muller et al. | 261/DIG. 75 |

FOREIGN PATENT DOCUMENTS

| | | | |
|---|---|---|---|
| 523252 | 4/1931 | Fed. Rep. of Germany | 261/142 |
| 2280421 | 2/1976 | France | 261/124 |
| 928628 | 6/1963 | United Kingdom | 261/77 |

Primary Examiner—Richard L. Chiesa
Attorney, Agent, or Firm—Weingram & Klauber

[57] ABSTRACT

A gasification device having an overall density greater than that of water is suspended by chains over six foot down in a body of waste water about nine foot deep in a treatment vessel of a waste water treatment plant. The device is about one and a half foot tall and one and a half foot in diameter. The device is ring-like to define a generally annular enclosed chamber for receiving, through an inlet, gas to be introduced into the waste water. The longitudinal axis passing through the plane of said ring is vertically oriented. The central opening of said ring defines a passageway for induced upward flow of the water. A constriction about six inches long and six inches in diameter is defined at the middle of the passageway and is provided with a circumferential row of 5/16 inch holes communicating with the annular chamber. As gas flows into the constriction from the holes the resulting ascending bubble stream induces flow of water upwardly through the passageway. The surfaces defining the passageway form a converging cone from the lower flow input end to the constriction, the cone acting in conjunction with the constriction to increase the flow velocity therethrough to augment shearing of gas bubbles emerging from the holes and to promote small bubble formation. The passageway surfaces also form a diverging cone above the constriction.

11 Claims, 5 Drawing Figures

APPARATUS FOR GASIFICATION OF LIQUIDS

This application is a continuation-in-part of my copending application Ser. No. 873,909 filed Jan. 31, 1978, now abandoned which in turn was a continuation-in-part of my application Ser. No. 708,565, filed July 26, 1976, now abandoned.

BACKGROUND OF THE INVENTION

This invention relates generally to devices for gasification of waste water and to waste water treatment plants which includes such gasification devices, including particularly devices for oxygenation of waste water.

Biological waste water treatment plants or the like provide treatment vessels wherein the natural processes of purification are accelerated by the mechanical introduction of an oxygen supply. Either pure oxygen or oxygen provided via air can be so introduced. Although approximately five times more air is required than oxygen to obtain the same degree of purification, the cost of industrial oxygen indeed favours the use of air in many such systems.

In order to provide sufficient oxygen from the air to enable the higher process rates it is necessary to introduce the air by means which function to increase the efficiency of gas transfer into the waste water. The devices thus utilized, whether introducing air or oxygen, also must function to enable thorough mixing, so that the reactants may be brought into intimate contact and without leaving dead areas of untreated liquid in the treatment vessel.

Several types of apparatus have been employed over the years for introducing air into liquids for the aforementioned purposes. Among these are surface aeration devices, which mechanically whip the waste liquor surface, to thereby expose more liquid surface to the surrounding air.

In a second type of aeration apparatus air is injected under pressure into the liquid body, to produce a mass of either small or large bubbles.

In another type of aeration apparatus, liquid under pressure is pumped from the bottom of a vessel and redistributed through a fine spray onto the liquid surface of the same vessel. This type of device in its mode of operation, is generally similar to surface aeration devices.

The present invention is particularly applicable to the aforementioned technology wherein air is injected into the body of the liquid to be treated, as by means of spargers, bubblers, or similar gas dispensers. In considering the mechanism of oxygen uptake or transfer in this environment, analysis by the inventor indicates that the principal factors encouraging maximum oxygen uptake from air are: (1) the bubble diameter should not be too large; (2) the bubbles injected from the dispenser should be encouraged to contact as much oxygen-starved liquid as possible immediately after emission from the dispenser; and (3) the oxygen-rich liquid immediately above the dispenser should be dispersed into the main body of liquid as rapidly as possible. In terms of these performance criteria, however, it is found that presently available commercial devices are inadequate in one or more such respects.

SUMMARY OF INVENTION

Now in accordance with the present invention there is provided a waste water treatment plant comprising:

a waste water treatment vessel having side walls and a bottom wall and being at least six feet in depth and at least eight feet in each transverse dimension;

at least one gasification device having an average operational density greater than that of water;

suspension means for suspending said device within a body of waste water received in said treatment vessel;

said device being less than about two feet in height and less than about two feet in each transverse dimension;

said suspension means suspending said device significantly closer to said bottom wall of said vessel than to the water surface;

gas supply means positioned adjacent said vessel and a gas supply conduit extending from said gas supply means to said device;

said device comprising a hollow ring-like enclosure defining a generally annular chamber for receiving gas to be introduced into said waste water;

gas inlet means connected to said gas supply conduit and communicating with said chamber for enabling flow of gas thereto;

the longitudinal axis passing through the plane of said ring being vertically oriented, and the central opening of said ring defined by the axially-facing surfaces of said enclosure defining a passageway for induced upward flow of said waste water;

an axially-extended constriction of substantially constant diameter defined at the middle of said passageway, said constriction provided with apertures communicating with said annular chamber to enable gas flow into said constriction, said gas flow and resulting ascending bubble stream inducing flow of water upwardly through said passageway, said gas flow and bubble stream comprising the sole means effecting said water flow;

the said surfaces of said enclosure bordering and defining said passageway forming a cone-like portion converging from the flow input end of said passageway to said constriction, to thereby define an axially-extended zone of flow convergence, whereby in conjunction with said constriction to increase the flow velocity through said constriction, thereby to augment shearing of gas bubbles emerging from said apertures and promote small bubble formation;

the said surfaces of said enclosure bordering and defining said passageway forming a second cone-like portion diverging axially for an extended length above said constriction, whereby to define an extended zone of flow divergence for distributing the gasified flow into the body of said waste water;

the body of water within said vessel being substantially free of structure other than said at least one device, suspension means and gas supply conduit, whereby said gasified flow initiates and sustains a circulation pattern in which at least the smaller diameter gas bubbles are carried down again into the body of the water after the gasified flow has ascended from said device to near the water's surface for prolonged exposure for oxygen transfer to the waste water.

BRIEF DESCRIPTION OF THE DRAWINGS

The invention is diagrammatically illustrated, by way of example, in the drawings appended hereto, in which.

DESCRIPTION OF PREFERRED EMBODIMENT

Figure 1:
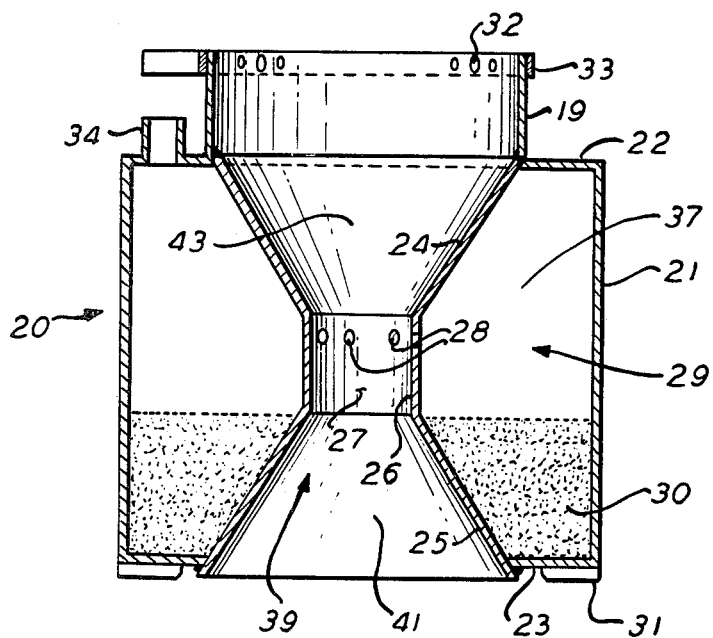
FIG. 1 is a longitudinal sectional view of a preferred embodiment of a gasification device in accordance with the invention, for a waste water treatment plant.
Figure 2:
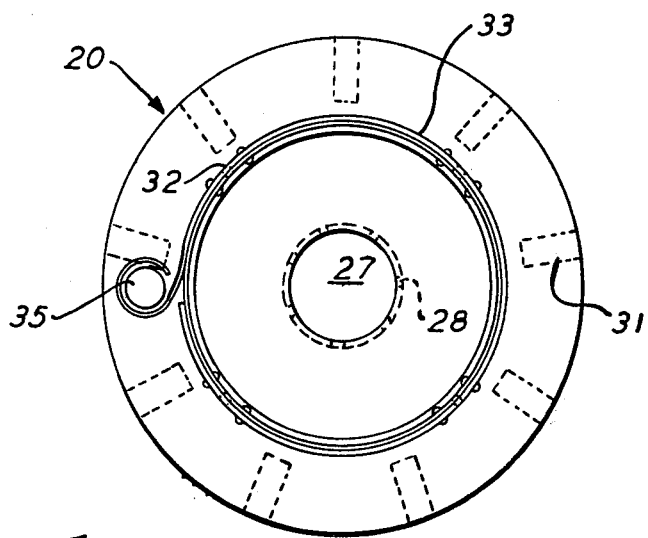
FIG. 2 is a top plan view of the device of FIG. 1.

In FIGS. 1 and 2 herein longitudinal cross-sectional and top plan views appear of a gasification device 20 in accordance with the invention. Device 20 comprises a cylindrical wall member 21, top and bottom wall members 22 and 23, inwardly facing sloping wall members 24 and 25, central wall member 26 joining members 24 and 25, and an upwardly directed extension 19. All of the cited wall members may be integrally formed or can be secured to one another by heat sealing, welding, etc. Because of their ease of fabrication, and especially their resistance to corrosion or chemical attack, certain plastics including especially polyethylene are preferred materials for the described portions of device 20.

The wall members 21, 22, 23, 24, 25 and 26 form a hollow generally ring-shaped body defining an annular chamber 29 enclosing a gas space 37. The lower portion of chamber 29 contains a weighting medium 30 in an amount in relation to the mass and contained volume of the device 20 so that the overall average density of the device is significantly greater than that of water, i.e. so that the overall mass of the device divided by its overall volume (which is of course annular, the volume of air in the central fluid flow passageway space not being a volume contained by the device) is in excess of 62.5 pounds per cubic foot, the density of water. The average density is taken with the gas space 37 full of air or other operational gas. Since the average density of the device is greater than that of water it will naturally sink. In operation the device is suspended within a body of water in a predetermined position in relation to the treatment vessel for enhanced results as will be described hereinafter.

The weighting medium 30 may be of the same or similar materials as that of which the device is formed, if such material is suitably dense, e.g. iron or steel, and may be formed integrally with the device. The medium 30 may alternatively be a different material from that of which the device is formed. Thus the medium may be concrete and is preferably concrete in a mix including up to about 50% by weight of iron shot. The concrete may be introduced in flowable form into the lower portion of chamber 29 to set therein.

Figure 3:
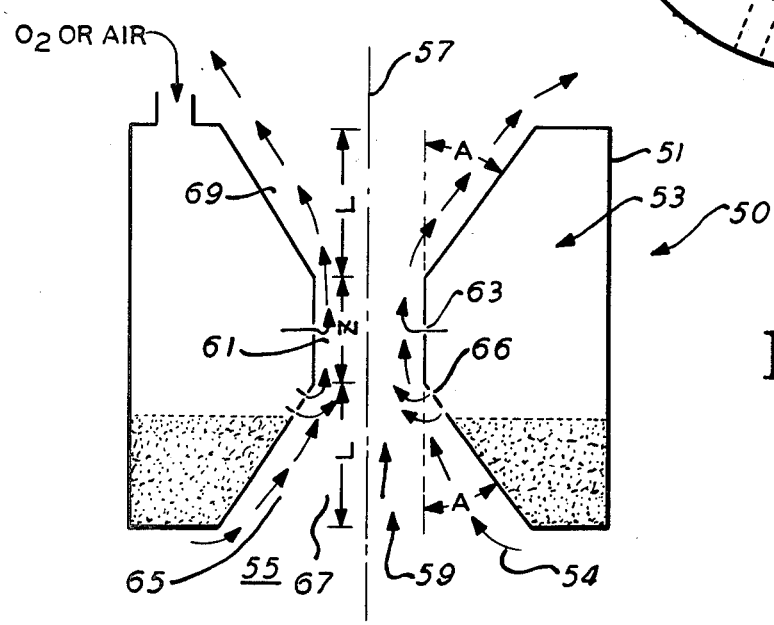
FIG. 3 is a longitudinal sectional view, similar to FIG. 1, but rendered in a schematic fashion in order to illustrate certain relationships in the illustrated device.

A gas inlet 34 is formed at the top surface 22 of member 20 for admission of gas such as air or oxygen from an external gas supply (see FIGS. 4 and 5) into the interior gas space 37 of the device 20. The gas inlet is a tubular member having an upper and a lower end as shown in FIGS. 1 and 3. The lower end communicates with the gas space 37 and the upper end opens upwardly and is provided with a standard gas supply hose connector (not shown). Where the device is formed, as is preferred, as an integrally formed injection moulding of plastics material, the tubular member 34 may be used on site as an entry point for flowable concrete to form the weighting medium 30. The devices are thus lightweight and easy to handle right up to the point of use on site. A funnel may then be used to assist pouring of concrete provided on site in through the tubular member 34 which has its open end facing upwardly for this purpose and also to ensure that the introduced concrete flows down to fill the lower one-quarter or so of the interior volume of the device in an even manner.

The axially-facing surfaces of members 24, 25 and 26 define a central passageway 39 through which the waste water in which device 20 is immersed may flow upwardly—upon such flow being induced by the gas flow introduced via inlet 34. Passageway 39 can be regarded as consisting of three successive portions, i.e. a lower converging cone-like portion 41 at the lower, flow inlet side of device 20; a central axially-extended constriction 27 of substantially constant diameter; and an upper, diverging cone-like portion 43 at the upper or flow outlet side of device 20.

Apertures 28 are located at the constriction 27 (i.e. through wall 26), to permit gas to pass from space 37 into constriction 27. The resulting ascending bubble stream acts to induce an upward flow through passageway 39 of the liquid in which device 20 is immersed. It should be understood that this ascending bubble stream is indeed the sole instrumentality effecting liquid flow through passageway 39—no mechanical pumps or the like are utilized with the instant apparatus. Further aspects of this action will be discussed below in connection with FIGS. 3 to 5.

Device 20 when immersed in waste water to be gasified is connected to a compressed air (or other gas) supply by a flexible pipe or hose (FIGS. 4 and 5), which is connected to inlet 34. The bottom surface of wall member 23 carries a series of formed feet 31, which enables stabilization of the device when it is standing on a surface in a non-operational position, i.e. when external of the treatment vessel.

In FIG. 3 herein, a longitudinal sectional view appears, which depicts a device generally similar to that described in connection with FIGS. 1 and 2. In the present view the showing however, is schematic—in order to enable discussion of certain dimensions and relationships which exist in the present apparatus, and which are instrumental in achieving the outstanding results enabled by such device.

As thus seen in FIG. 3, the present device 50 may be regarded as consisting of a ring-like enclosure 51 defining a generally annular chamber 53—to which air or oxygen is provided in accordance with previous discussion. The entire device is in use suspended in a predetermined position in a body of waste water which is generally designated at 55 and can be regarded as enveloping the device 50 as will be described in connection with FIGS. 4 and 5.

The device 50 is externally a little less than about one and a half feet tall and a little less than about one and a half feet in diameter. Its effective volume is considerably less than one cubic foot and it includes about 75 pounds weight of concrete as the weighting medium giving an average density significantly in excess of the density of water. The device may be made up to about two foot high and across (and include a correspondingly greater weight of concrete), but the smaller size particularly described above is preferred. The inventor has found that large size aeration equipment is disadvantageous in that firstly it does not increase oxygen transfer rate per device since this rate is better for smaller bubbles; secondly the more bulky equipment creates more opportunities for dead spaces to occur in which stagnant water can be trapped and not be drawn into the aerating circulation pattern: and thirdly the frictional drag of bulky equipment on the circulating flow of aerated water slows down the speed of the circulation pattern and thus reduces the number of passes per unit time any given waste water particle makes through the eye of the aeration device.

Pursuant to the present invention it is seen that the central axis 57 which passes through the plane of the ring, is thus aligned with the central passageway 59 of device 50. This passageway 59, in turn, can be deemed to consist of three contiguous portions: firstly a central, axially-extended constriction 61, which is provided with apertures 63 as previously discussed. This constriction 61 is of substantially constant diameter and extends for a substantial axial distance, the constriction preferably being about six inches in diameter and about six inches in vertical length. The apertures 63 are preferably in the form of bores located at closely spaced intervals along a circumferential line extending horizontally around the constriction 61 substantially centrally of the length thereof. The bores are about one-quarter inch in diameter, and were 5/16 inches in a particular proven embodiment.

In addition to the central constriction 61, it will be seen that axially-facing surfaces of enclosure 51 define a converging cone-like portion 65, which extends from the lower, flow input side 67 of device 51 to constricted portion 61. This portion 65 extends for a substantial axial length, as will be further discussed hereinbelow, and serves in conjunction with constriction 61 to increase the flow velocity through such constriction once the flow is induced by the ascending bubble stream created by gas streaming through the apertures 63 from chamber 53 of enclosure 51. (The general flow pattern thus induced is suggested in the Figure by arrows 54.) The constriction 61 thus acts in conjunction with converging portion 65 to throttle the flow and increase the velocity of same. This, in turn, creates a high shearing at apertures 63, for the purposes aforementioned, i.e. to produce small bubble size as the individual gas bubbles emerge from such apertures. It will be appreciated that the ratio of the surface area of a bubble to its volume increases for smaller bubbles (in inverse proportion to the radius). Oxygen transfer rate is influenced by the bubble surface area and thus the efficiency of oxygen transfer increases for smaller bubbles. Hence an advantage of the shearing effect produced by the present device.

In addition to the two passageway portions thus far described, a third portion is present in accordance with the invention. In particular it is seen that the axially-facing surfaces of the enclosure 51 above the constriction 61 form a diverging cone-like portion 69 of (again) axially-extended dimensions. This portion 60 serves to disperse the oxygenated or aerated liquid into the general body of the waste water in the treatment vessel in a vigorous circulation pattern as will be described below.

It has been found that certain relationships are preferred as between the converging and diverging cone-like portions 65 and 69, and the constriction 61—in order to provide appropriate increase in flow rates through the constriction, and appropriate divergence of flow to achieve the required rapid distribution and dissipation of the aerated stream as a vigorous circulation pattern. Referring to FIG. 3, it is thus found that the ratio R of the axial lengths L of portions 65 and 69 to the length Z of the constriction 61, i.e. the ratio L/Z should be between 1:1 and 2:1.

In the presence of the above relationships the angle of convergence or divergence A of the cone-like portions 65 and 69 (A is the angle which the walls of portions 65 and 69 make with axis 57) should be from between 15° to 45°, preferably from 25° to 35°, and optimally about 30°. Preferably the diameter D of constriction 61 is approximately equal to its axial length Z. In a typical apparatus design pursuant to the foregoing criteria, constriction 61 may have a diameter of about six inches, a corresponding axial length Z, and be provided with a circumferential row of apertures 63 of about 5/16 inch diameter.

Figure 4:
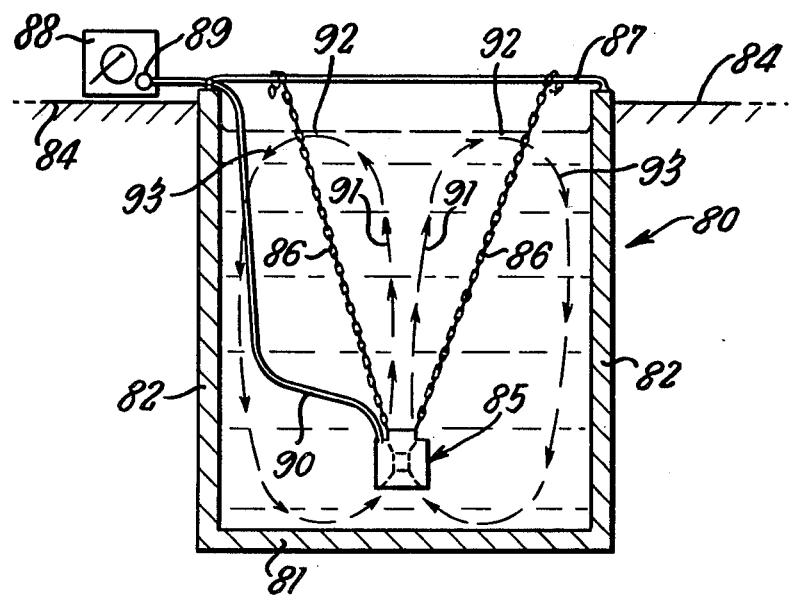
FIG. 4 is a vertical cross-section, on line 4—4 of FIG. 5, through a waste water treatment plant according to the invention, showing the device of FIGS. 1-3 suspended therein.
Figure 5:
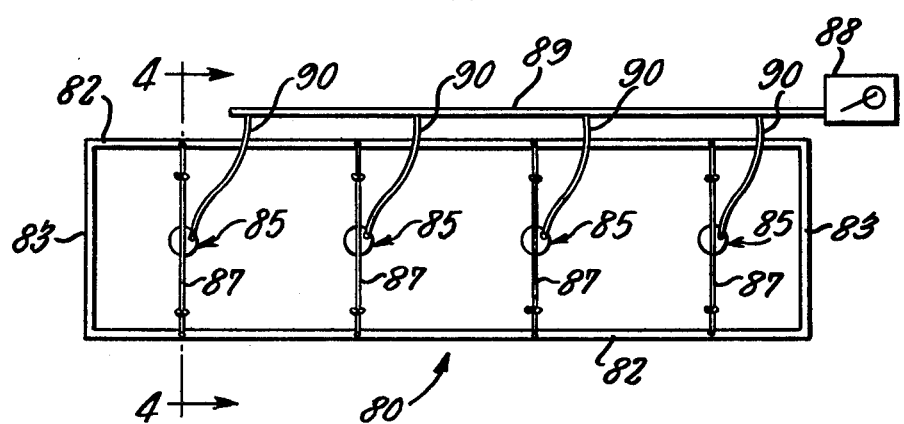
FIG. 5 is a top plan view of the treatment plant of FIG. 4.

Referring now to FIGS. 4 and 5 there is shown respectively a cross-section and a top plan view of a waste water treatment plant according to the present invention. The plant comprises a treatment vessel 80 having a bottom wall 81, a pair of opposed longer side walls 82, and a pair of opposed shorter side walls 83. The vessel is conventionally constructed, e.g. of steel or preferably concrete, and is sited below ground level 84. The vessel is at least six foot and preferably about nine foot in depth up to the normal water filling line, a space of up to a further one foot or so being preferred to reduce splashing from the vigorous circulation patterns set up in operation of the gasification devices of the invention. The illustrated vessel is about nine foot in width and thirty-six foot in length, although it will be apparent that many other choices of lateral dimensions may be used within the context of the following teachings regarding optimal placement of the devices in relation to the dimensions of the treatment vessel.

Four gasification devices 85 as particularly described above in relation to FIGS. 1 to 3 are suspended in the vessel 80 in a regular pattern about nine foot apart from one another so that, as seen in FIG. 5, each device serves to treat a body of waste water having a surface area of about eighty-one square feet, and a volume of 729 cubic feet when the water is also nine foot deep. The devices are suspended at a uniform depth centrally of their treatment area when viewed from above in FIG. 5.

The devices 85 are each suspended by two chains 86, or nylon ropes, secured to the devices 85 by being passed through openings 32 in a metallic support ring 33 which is secured about the top extension 19, as shown in detail in FIG. 1. The upper ends of the pairs of chains 86 are adjustably secured, e.g. by shackles, to support rods 87 which span the vessel and are secured at their opposite ends to the side walls 82.

An air compressor 88 is mounted adjacent the vessel and supplies compressed air to a manifold 89 which in turn supplies air to four flexible hoses 90 extending to the devices 85. The hoses 90 are connected by conventional hose connections to the tubular members gas inlet 34 of each device shown in FIGS. 1 and 3.

Each device 85 is a little less than about one and a half feet tall and one and a half feet in diameter and its suspension chains are adjusted to suspend it with its top about six and a half feet below the water surface and its base about one foot above the bottom wall 81. The measurements quoted in this paragraph give optimum results, as has been found after considerable experimentation by the inventor, but certain benefits of the invention can be achieved by reasonable departures therefrom. It has already been explained how no advantage is achieved by making the device itself any larger than about two foot tall and two across, and similarly an effective flow pattern for an economically useful waste water treatment plant would not be achieved for a device much smaller than about one foot tall and one foot across.

For a water depth less than about six foot the circulation pattern does not seem to acquire the full effectiveness and efficiency achieved when the depth of clear waste water above the device, unobstructed by an substantial of water below the device should not much exceed one foot so as to ensure a powerful scouring flow across the base 81 to prevent pile-up of suspended matter attempting to settle out of the waste water.

Each device optimally treats a body of water about eighty square feet in surface area, about nine foot by nine foot in the FIGS. 4 and 5 embodiment. The advantages of the invention tail off when the devices are spaced too far apart in a laterally extensive treatment vessel. Thus three equally spaced devices could perhaps be used in FIG. 5, but two devices only would leave dead areas of sluggishly moving water and piles of settled matter on the floor.

The dimensions and proportions have been discussed at length because experiment has made it clear that the device and the treatment vessel work together to achieve startlingly effective and efficient results in terms of the parameter that counts to those skilled in the art: namely in terms of the weight of oxygen transferred to the liquid phase per unit of energy required to run the equipment, that is the energy required to run the air compressor 88.

With the treatment plant arranged and dimensioned optimally as described above, or near optimally, and with the body of water within the vessel being substantially free of structure other than said devices 85, chains 86 and hoses 90 (the chains and hoses both being insubstantial in bulk and flexible) it is found that the gasified flow created by each device in the treatment vessel initiates and sustains a circulation pattern of such remarkable vigour that at least the smaller diameter gas bubbles are carried down again into the body of the waste water after the gasified flow has ascended from said device to near the water surface, for prolonged exposure for oxygen transfer to the waste water.

Thus these small bubbles travel up, across and down again as shown by arrows 91, 92 and then 93 in FIG. 4, in which the dotted lines indicate the circulation pattern achieved by the device. This effect is greater the smaller the bubble diameter since the buoyancy of a bubble depends upon its volume (radius cubed) while the water resistance to its upward motion depends only on its frontal area (radius squared).

It will be appreciated that the circulation pattern is generally symmetrical in all vertical planes through the device. It will also be appreciated that the circulation pattern, substantially unimpeded by other structure, encompasses the whole predetermined optimal volume of waste water worked by that device, thus not only reducing the dead areas to a minimum but also ensuring that each waste water particle becomes entrained in the circulation pattern and passes at regular intervals through the eye of the aeration device for a fresh charge of small bubbles. As the circulation pattern builds up to its full vigour after start-up, the bubble shearing effect likewise increases to as to increase the proportion of smaller bubbles which are not only more efficient at oxygen transfer but are also more easily carried round and down again at 93 into the body of the waste water for prolonged exposure for oxygen transfer. Some small bubbles indeed are thus capable of almost complete dissolution in the water, i.e. approach 100% efficient transfer. Certain prior art devices in use resulted in large bubbles breaking the water surface, which it will now be understood from the above represent a waste of energy input to the plant.

It will be understood that upon start-up the initial compressed air flow has to drive waste water out of the submerged hose lengths and out of the devices through the bores.

While the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly the invention is to be broadly construed, and limited only by the scope and spirit of the claims now appended hereto.

I claim:

1. A waste water treatment plant comprises:
a waste water treatment vessel having side walls and a bottom wall and being at least six feet in depth and at least eight feet in each transverse dimension;
at least one gasification device having an average operational density greater than that of water;
suspension means for suspending said device within a body of waste water received in said treatment vessel;
said device being less than about two feet in height and less than about two feet in each transverse dimension;
said suspension means suspending said device significantly closer to said bottom wall of said vessel than to the water surface;
gas supply means positioned adjacent said vessel and a gas supply conduit extending from said gas supply means to said device;
said device comprising a hollow ring-like enclosure defining a generally annular chamber for receiving gas to be introduced into said waste water;
gas inlet means connected to said gas supply conduit and communicating with said chamber for enabling flow of gas thereto;
the longitudinal axis passing through the plane of said ring being vertically oriented, and the central opening of said ring defined by the axially-facing surfaces of said enclosure defining a passageway for induced upward flow of said waste water;
an axially-extended constriction of substantially constant diameter defined at the middle of said passageway, said constriction provided with apertures communicating with said annular chamber to enable gas flow into said constriction, said gas flow and resulting ascending bubble stream inducing flow of water upwardly through said passageway, said gas flow and bubble stream comprising the sole means effecting said water flow;
the said surfaces of said enclosure bordering and defining said passageway forming a cone-like portion converging from the flow input end of said passageway to said constriction, to thereby define an axially-extended zone of flow convergence, whereby in conjunction with said constriction to increase the flow velocity through said constriction, thereby to augment shearing of gas bubbles emerging from said apertures and promote small bubble formation;

the said surfaces of said enclosure bordering and defining said passageway forming a second cone-like portion diverging axially for an extended length above said constriction, whereby to define an extended zone of flow divergence for distributing the gasified flow into the body of said waste water;

the body of water within said vessel being substantially free of structure other than said at least one device, suspension means and gas supply conduit, whereby said gasified flow initiates and sustains a circulation pattern in which at least the smaller diameter gas bubbles are carried down again into the body of the water after the gasified flow has ascended from said device to near the water's surface for prolonged exposure to oxygen transfer to the waste water.

2. A waste water treatment plant according to claim 1 wherein said device is externally in the shape of a cylinder a little less than about one and one-half feet tall and a little less than about one and one-half feet in diameter.

3. A waste water treatment plant according to claim 2 wherein said axially extended constriction has a minimum diameter of about six inches and is about six inches in vertical length.

4. A waste water treatment plant according to claim 3 wherein the angle A made by the walls of said converging and divering cone-like portions with respect to said axis is between 15° and 45°; and wherein the ratio R of the axial dimension L of said cone-like portions to the axial dimension Z of said constriction is in the range of from about 1:1 to 2:1.

5. A waste water treatment plant according to claim 3 wherein said apertures comprise bores located at closely spaced intervals along a circumferential line extending horizontally around said constriction substantially centrally of the vertical length of the constriction.

6. A waste water treatment plant as claimed in claim 5 wherein said bores are about one-quarter inch in diameter.

7. A waste water treatment plant as claimed in claim 3 including about 75 pounds weight of concrete deposited within the lower portion of said hollow enclosure to achieve said average density for the device greater than that of water.

8. A waste water treatment plant according to claim 1 wherein said vessel is about nine foot in depth, said device is a little less than about one and one-half feet tall and said suspension means suspends said device with its top about six and one-half feet below the water surface and its base about one foot above the bottom wall of said treatment vessel.

9. A waste water treatment plant according to claim 1 wherein said vessel is laterally extensive, a plurality of said gasification devices are provided therein, each said device having an associated said suspension means and said gas supply conduit, and wherein said gasification devices are disposed at a substantially uniform depth in a substantially regular pattern about nine foot apart from one another whereby each device serves to treat a body of waste water having a surface area of about eighty square feet.

10. A waste water treatment plant according to claim 1 wherein said gas supply means is an air compressor for supplying air to the or each said device at a rate in the range of from 1400 to 2400 cubic feet per hour.

11. A gasification device for a waste water treatment plant, said device comprising:

a hollow ring-like enclosure defining a generally annular chamber for receiving gas to be introduced into said waste water;

gas inlet means communicating with said chamber for enabling flow of gas thereto, said inlet means comprising a tubular member having an upper and a lower end, said lower end communicating with the upper portion of said chamber and the upper end of said tubular member opening upwardly and having a gas supply hose connection;

the longitudinal axis passing through the plane of said ring being vertically oriented when said device is immersed in said waste water, and the central opening of said ring defined by the axially-facing surfaces of said enclosure defining a passageway for induced flow of said waste water;

an axially-extended constriction of substantially constant diameter defined at the middle of said passageway, said constriction provided with apertures communicating with said annular chamber to enable gas flow into said constriction, the said gas flow and resulting ascending bubble stream inducing flow of water upwardly through said passageway, said gas flow and bubble stream comprising the sole means effecting said water flow;

the said surfaces of said enclosure bordering and defining said passageway forming a cone-like portion converging from the flow input end of said passageway to said constriction, to thereby define an axially-extended zone of flow convergence, whereby in conjunction with said constriction to increase the flow velocity through said constriction, thereby to augment shearing of gas bubbles emerging from said apertures and promote small bubble formation;

the said surfaces of said enclosure bordering and defining said passageway forming a second cone-like portion diverging axially for an extended length above said constriction, whereby to define an extended zone of flow divergence for distributing the gasified flow into the body of said waste water;

said device being externally a little less than about one and one-half feet tall and a little less than about one and one-half feet in diameter, said constriction having a minimum diameter of about six inches and being about six inches in vertical length, said apertures being regularly spaced bores about one-quarter of an inch in diameter;

said device being integrally formed of plastics material and including about 75 pounds weight of concrete introduced through said tubular member to set in the lower portion of said hollow enclosure to achieve an average density for said device in air greater than that of water; and said device being provided with attachment means for attaching suspension means thereto to permit said device to be suspended thereby in a body of waste water in a waste water treatment vessel.

* * * * *